UNITED STATES PATENT OFFICE.

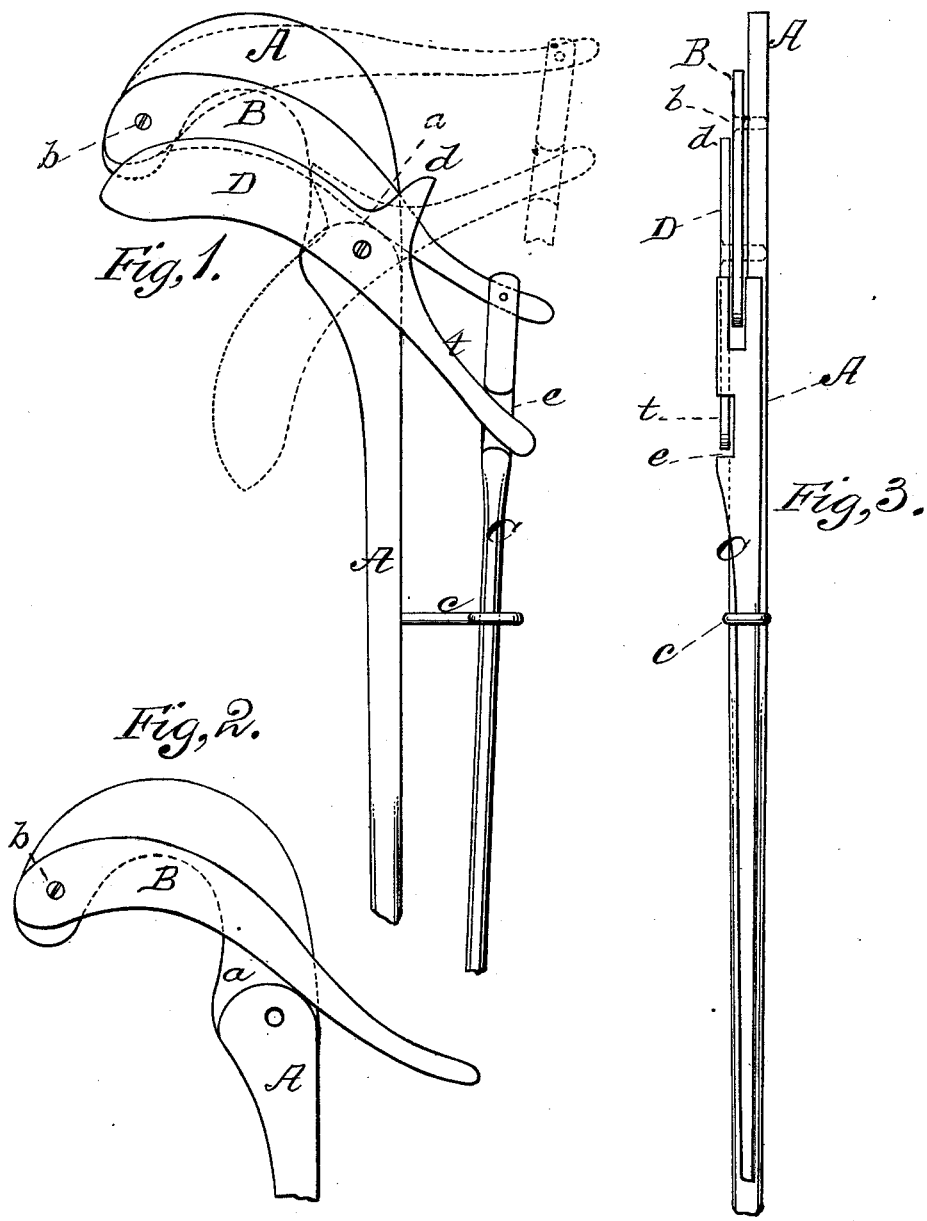

GEORGE J. CLINE, OF GOSHEN, INDIANA.

IMPROVEMENT IN PRUNING-SHEARS.

Specification forming part of Letters Patent No. 218,233, dated August 5, 1879; application filed May 24, 1879.

*To all whom it may concern:*

Be it known that I, GEORGE J. CLINE, of Goshen, in the county of Elkhart and State of Indiana, have invented a new and valuable Improvement in Pruning-Shears; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a side view of my improved shears. Fig. 2 is a detail view of the hook-head and upper knife, and Fig. 3 is an edge view of the shears complete.

This invention has relation to pruning-shears; and it consists in the construction and novel arrangement of the hooked slide-head, the upper blade pivoted at one end to the end of the hook and at the other to the end of the vertically-working slide-rod, the lower blade pivoted at its middle portion to the body of the hook, and having a slide end, which works in a notch of the operating-rod, all as hereinafter fully shown and described.

In the accompanying drawings, the letter A designates the slide-head, the upper end of which is in hook form, as shown, the hook portion being depressed a little down to the shoulder $a$, to afford room for the operation of the upper knife, B. This knife or blade is pivoted at its forward end to the end of the hook, as shown at $b$, its rear end being pivoted to the upper end of the vertically-working operating-rod C. To this rod the lower end of the slide-head A is connected by means of an eye, $c$, through which the rod passes.

The lower blade or knife, D, is pivoted at its middle portion or body to the shank of the hook, just below the shoulder $a$, and is provided with a guide arm or spur, $d$, which projects upward, and engages the side of the upper knife as it descends, thereby keeping the two knives or blades in proper relation under strain.

The rear end of the lower blade is made in the form of a slide-arm, $t$, which works in a notch or seat, $e$, in the operating-rod below the point at which the rear end of the upper blade is pivoted. Therefore it does not interfere with the vertical working of the rod. The stroke of the lower blade is in a direct line between the pivotal point of the upper blade and the eye $e$. At the same time this eye or slide seat $e$ forms a stop, preventing the slide-head from falling too low.

The blades are opened by the gravitation of the slide-head, the upper blade rising in rear of its pivot to the hook and the lower blade falling, thereby, with comparatively slight motion of the slide-head, affording a large space.

The cutting is effected by drawing down the operating-rod, which quickly depresses the upper knife and raises the lower one, so that they are brought into engagement.

The shoulder $a$ serves to engage the rear portion of the upper knife when the cut is fully made, forming a stop, under the operation of which the blade cannot be strained, because it is between the pivotal points of said blade.

These shears are simple in construction, readily operated, and very strong, being, on account of the end pivoting of the upper blade and its backing against the hook, but little liable to a twisting strain.

Having described this invention, what I claim, and desire to secure by Letters Patent, is—

The pruning-shears consisting of the hooked slide-head A, the upper blade, B, pivoted at one end to the end of the hook and at the other end to the end of the operating-rod, which moves in slide-eye $c$ upon the shank of the slide-head, and the lower blade, D, pivoted at its middle portion to the body of the hook, and having a slide end, $t$, which works in a notch or seat of the operating-rod, substantially as specified.

In testimony that I claim the above I have hereunto subscribed my name in the presence of two witnesses.

GEORGE J. CLINE.

Witnesses:
 HENRY V. CURTIS,
 UTLEY B. CURTIS.